(12) United States Patent
Matthews et al.

(10) Patent No.: US 8,803,032 B2
(45) Date of Patent: *Aug. 12, 2014

(54) HYBRID POWERED WELDER

(75) Inventors: William T. Matthews, Chesterland, OH (US); Bryce Muter, Troy, OH (US); Frank M. Stupczy, Mayfield Village, OH (US)

(73) Assignee: Lincoln Global, Inc., City of Industry, CA (US)

( * ) Notice: Subject to any disclaimer, the term of this patent is extended or adjusted under 35 U.S.C. 154(b) by 101 days.

This patent is subject to a terminal disclaimer.

(21) Appl. No.: 13/241,763

(22) Filed: Sep. 23, 2011

(65) Prior Publication Data

US 2012/0074116 A1 Mar. 29, 2012

Related U.S. Application Data

(62) Division of application No. 10/919,815, filed on Aug. 17, 2004, now Pat. No. 8,080,761.

(51) Int. Cl.
*B23K 9/10* (2006.01)

(52) U.S. Cl.
CPC ............. *B23K 9/1081* (2013.01); *B23K 9/1075* (2013.01)
USPC .......................... 219/130.1; 219/133; 219/134

(58) Field of Classification Search
USPC .......................... 219/133, 130.1, 134; 320/137
See application file for complete search history.

(56) References Cited

U.S. PATENT DOCUMENTS

| | | | | |
|---|---|---|---|---|
| 3,676,694 | A | * | 7/1972 | Schneider et al. ............. 219/134 |
| 6,098,734 | A | * | 8/2000 | Kawamura ............... 180/65.245 |
| 6,982,398 | B2 | * | 1/2006 | Albrecht ........................ 219/133 |
| 8,080,761 | B2 | * | 12/2011 | Matthews et al. ............. 219/134 |
| 2005/0109748 | A1 | * | 5/2005 | Albrecht et al. ........... 219/130.1 |
| 2005/0263514 | A1 | * | 12/2005 | Albrecht ........................ 219/133 |

FOREIGN PATENT DOCUMENTS

| | | | | |
|---|---|---|---|---|
| JP | 61-135479 | A | * | 6/1986 |
| JP | 5-277729 | A | * | 10/1993 |
| JP | 6-182548 | A | * | 6/1994 |
| JP | 10-094192 | A | * | 4/1998 |
| JP | 10-314939 | A | * | 12/1998 |
| JP | 2001-212668 | A | * | 8/2001 |

OTHER PUBLICATIONS

Machine translation of Japan Patent Document No. 5-277,729, Mar. 2013.*
Machine translation of Japan Patent Document No. 6-182,548,Mar. 2013.*
Machine translation of Japan Patent Document No. 10-314,939,Mar. 2013.*
Machine translation of Japan Patent Document No. 2001-212,668,Mar. 2013.*

* cited by examiner

*Primary Examiner* — Geoffrey S Evans
(74) *Attorney, Agent, or Firm* — Hahn Loeser & Parks LLP

(57) ABSTRACT

An electric arc welder that includes a energy storage device and non-battery power source for the formation of an electric arc. The welder also includes battery charging circuit that controls the charging of the energy storage device by the non-battery power source. The non-battery power source can include an engine driven electric generator, power grid or a fuel cell.

4 Claims, 3 Drawing Sheets

HYBRID POWERED WELDER

RELATED PATENT APPLICATIONS

This application is a divisional of U.S. patent application Ser. No. 10/919,815, filed on Aug. 17, 2004.

TECHNICAL FIELD

The invention relates to the art of electric arc welding and more particularly to an electric arc welder powered by a plurality of different energy sources.

BACKGROUND OF THE INVENTION

Electric arc welders that generate more than 100 amps of welding current typically require a fuel-powered engine to drive an electric generator which in turn generates the required current for a welding operation. The size of the engine and electric generator is dictated by the maximum welding output rating of the welder. For instance, a welder that is rated to generate a 300-amp, 33.3 volt arc requires 10 kilowatts of power to generate such an arc. The engine in such a welder must have a large enough horse power to drive an electric generator to generate at least 10 kilowatts of power so as to supply the maximum welding output rating of the welder at any given time. The cost associated with large engines and associated electric generators significantly increases when large welding currents are required. The size of the engine and electric generator and the size of the fuel tank required to power the engine results in a significant increase in the size and the weight of the engine welder, which also results in increased cost and increased inconvenience in moving and storage of the welder. The energy inefficiencies that are associated with engine welders are also significant, especially in light of increased energy costs. The duty cycle during a normal stick welding operation is typically between 20-40% of the time. As a result, 60-80% of the time, the power being generated by the engine driven electric generator is not used, thus is wasted.

In view of the current state of engine driven welders, there is a need for a lower cost and/or more energy efficient arc welder.

BRIEF DESCRIPTION

The present invention is an improvement in electric arc welder technology. The invention is particularly directed to electric arc welders having hybrid energy sources and the advantages associated with the use of such hybrid energy sources. The hybrid energy source includes one or more battery power sources and one or more non-battery power sources. The battery power source can be any type or combination of energy storage device. Typically the battery power source is formed from a single battery or multiple batteries; however, one or more other energy storage devices (e.g., capacitor, inductor, fly wheel, etc.) can be combined with and/or be used as an alternative to one or more batteries. The battery power source is typically rechargeable. When batteries are included in the battery power source, the same type of battery is typically used; however, this is not required. The non-battery power source typically includes an electric generator that is driven by a fuel-powered engine; however, the non-battery power source can alternatively include, but is not limited to, one or more fuel cells, solar cells, power grid (e.g., an electric outlet, etc), etc. The electric arc welder typically includes one battery power source and one non-battery power source; however, multiple battery power sources and/or multiple non-battery power sources can be used. If multiple non-battery power sources are used by the electric arc welder, the multiple non-battery power sources are typically different; however, this is not required. The use of a hybrid energy source in an electric arc welder provides several advantages. These advantages include, but are not limited to, the use of smaller fuel powered engines to drive an electric generator, increased energy efficiencies, increased versatility in using the electric arc welder, less noise, less pollution, less weight, small size, reduced cost, etc.

In accordance with one aspect of the present invention, there is provided an electric arc welder including a hybrid energy source that includes an engine driven electric generator and at least one rechargeable battery. The design of the engine driven electric generator can be similar to previous designs used in current engine electric arc welders. The engine is typically a diesel powered or gasoline powered engine; however, other types of engines can be used which utilize different types of fuel mixes. The electric generator generates an AC current. Typically, the current generated by the electric generator is rectified to form a DC current; however, this is not required. The battery power source that is used by the electric arc welder is used as the principal energy source for supplying current for the electric arc or can be used in combination with the non-battery power source to jointly supply current for the electric arc. An electric circuit in the electric arc welder is typically used to direct the current from one or more power sources to an electrode as needed during a welding procedure. The electric circuit can also include a waveform controller to control the waveform of the welding current. In one non-limiting design, the current generated by the engine driven electric generator is rectified to form a DC current. This rectified DC current is then added to the DC current provided by the battery power source. These two currents are then directed into an electric circuit which forms a particular current waveform for use in a particular welding operation. In another non-limiting design, the DC current from the battery power source is passed through a circuit to create an AC current. This AC current is then combined with the AC current from the engine driven electric generator. The accumulative AC current is then directed into an electric circuit to form the desired current waveform for a particular welding operation. In still another non-limiting design, the DC current from the battery power source is directed into an electric circuit which forms a particular current waveform for use in a particular welding operation.

The AC current generated by the electric generator is rectified into a DC current which is used to recharge the battery power source. As can be appreciated, many other current control systems can be used to form the current waveform for a welding operation can be used. The use of the battery power source in combination with the engine driven electric generator enables the electric arc welder to use a smaller engine than previously required. For example, an electric arc welder that is designed to generate a 300-amp current at 33.3 volts has a maximum welding output rating of 10 kW of power. A conventional engine driven electric arc welder would need to have an engine and electric generator that could constantly produce this level of power. The normal duty cycle for most manual stick electric arc welding systems is about 20-40%. As a result, a welding arc is formed and used only about two to four minutes out of every 10 minutes.

Although the current demands from the electric arc generator are only required 20-40% of the time, the engine driving the electric generator must constantly produce the maximum required power to ensure that the proper amount of current is instantly available during the arc welding procedure. The use of the hybrid power system of the present invention overcomes this limitation. A battery power source is able to store energy and can supply such stored energy on demand. As such, a smaller engine/electric generator size can be utilized to only replenish the energy being used when an arc is generated. The use of a smaller sized engine can result in a reduction in the weight and the material costs of the electric arc welder. In addition, the size of the arc welder may be reduced due to the reduction size of the engine. The smaller engine also produces less noise and consumes less fuel during operation. Less exhaust gases may also be generated by the smaller engine. Furthermore, the energy efficiencies are significantly increased since over a majority of the energy generated by the engine welder is stores and/or used to generate an electric arc. In another and/or alternative aspect of the present invention, there is provided an electric arc welder including a hybrid energy source that includes a fuel cell and a rechargeable battery. The design of the fuel cell can be similar to the fuel cell disclosed in U.S. Pat. No. 6,653,596, which is incorporated herein by reference.

The fuel cell can be an "indirect" or "reformer" fuel cell or a "direct oxidation" fuel cell. The one or more fuel cells can be a proton exchange membrane fuel cell, a phosphoric acid fuel cells, an alcohol fuel cell (e.g., ethanol, methanol, etc.), an alkaline fuel cell, a solid oxide fuel cell, and/or a regenerative (reversible) fuel cell. As can be appreciated, other types of fuel cells can be used. Typically a plurality of fuel cells are stacked together to increase the voltage and/or current generated by the fuel cells; however, this is not required. The plurality of fuel cells can be connected together in parallel and/or in series. One or more of the products of the fuel cell (e.g., carbon dioxide, carbon monoxide, etc.) can be at least partially used as a shielding gas for the arc welder. The fuel cell can include a dehumidifier, condenser and/or scrubber to remove undesired gases and/or liquids from the product gas prior to using the product gas as a shielding gas. The one or more fuel cells can be connected to a buck circuit or a boost-buck circuit to increase the voltage generated by the one or more fuel cells. The current generated by the one or more fuel cells is typically a DC current that can be used to charge the one or more battery power sources.

The battery power source that can be used by the electric arc welder is used as the principal energy source for supplying current for the electric arc or can be used in combination with the non-battery power source to jointly supply current for the electric arc. An electric circuit in the electric arc welder is typically used to direct the current from one or more power sources to the welding electrode as needed during a welding procedure. The electric circuit can also include a waveform controller to control the waveform of the welding circuit. In one non-limiting design, the current generated by the fuel cell power source and battery power source are directed into an electric circuit which forms a particular current waveform for use in a particular welding operation. In another non-limiting design, the DC current from the fuel cell power supply and the battery power source is passed through a circuit to create an AC current that is directed into a circuit to form the desired current waveform for a particular welding operation. In still another non-limiting design, the DC current from the battery power supply is directed into an electric circuit which forms a particular current waveform for use in a particular welding operation. The current generated by the fuel cell power supply is used to recharge the battery power source. As can be appreciated, many other current control systems used to form the current waveform for a welding operation can be used.

The battery power source can be used in combination with the fuel cell to eliminate the need for the fuel cell to constantly generate enough current for the peak current demand during an arc welding process. The use of the battery power source in combination with the fuel cell power source enables the fuel cell power source to be sized to merely provide a sufficient amount of power over a certain time period to sustain a charge on the battery power source. For example, an electric arc welder that is designed to generate a 300-amp current at 33.3 volts would require an energy source to generate 10 kW of power. The normal duty cycle for most manual stick electric arc welding systems is about 20-40%. As a result, the welding arc only draws an average of about 2-4 kW of power. As such, the fuel cell power source need only be sized to supply this lower average amount of power. The battery power source could be designed individually or in combination with the fuel cell power source to supply sufficient current for peak current demand. During the time period an electric arc is not being generated, the current from the fuel cell power source would be used to recharge the battery power source. As such, the fuel cell power source is able to take advantage of the no-load period to store energy in the battery power source, thereby significantly reducing energy losses and waste, thus making the welder much more energy efficient.

As can be appreciated, the use of the fuel cell power source in combination with the battery power source enables higher transient power capability to the welder than possible with a single electrical source. The use of the battery power source in combination with the fuel cell power source also enables the use of fuel cells in welders. Although fuel cells have been proposed for use in welders, the optimum transient characteristics of the fuel cells made the fuel cells difficult to use as a power source for a welder. The combination of a battery power source with the fuel cell power source significantly overcomes these problems. The use of a fuel cell power source and a battery power source also results in a significant reduction of operational noise as compared with engine driven welders.

In still another and/or alternative aspect of the present invention, there is provided an electric arc welder including a hybrid energy source that includes a fuel cell, and engine driven electric generator and a rechargeable battery. The current generated by the one or more fuel cells and one or more engine driven electric generators can be used to charge the one or more battery power sources. The battery power source that is used by the electric arc welder can be used as the principle energy source for the electric arc or can be used in combination with the non-battery power sources (i.e., the fuel cell and the engine driven welder) to generate the electric arc. An electric circuit in the electric arc welder can be used to direct the current from one or more power sources to the welding electrode as needed during a welding procedure. The electric circuit can also include a waveform controller to control the waveform of the welding circuit. In one non-limiting design, the current generated by the fuel cell power source, the engine driven electric generator and the battery power source are directed into an electric circuit which forms a particular current waveform for use in a particular welding operation. One or more of the power supplies can have the current rectified and/or formed in a particular waveform to be used to generate an electric arc and/or further modified prior to being used to generate the electric arc. In still another non-limiting design, the DC current from the battery power supply is directed into an electric circuit which forms a particular current waveform for use in a particular welding operation. The current generated by the fuel cell power supply and the engine driven welder are used to recharge the battery power source. As can be appreciated, many other current control systems used to form the current waveform for a welding operation can be used. The battery power source can be used in combination with the fuel cell and engine driven electric generator to eliminate the need for the fuel cell and/or the engine driven electric generator to constantly generate enough current for the peak current demand during an arc welding process. The use of the battery power source in combination with the fuel cell power source and the engine driven electric generator enables the fuel cell power source and the engine driven electric generator to be sized merely to provide a sufficient amount of power over a certain time period to maintain the charge on the battery power source. The battery power source would be designed individually or in combination with the fuel cell power source and/or engine driven electric generator to supply sufficient current for peak current demand. During the time period an electric arc is not being generated, the current from the fuel cell power source and engine driven electric generator would be used to recharge the battery power source. As such, the fuel cell power source and the engine driven electric generator is able to take advantage of the no-load period to store energy in the battery power source, thereby significantly reducing energy losses and waste, thus making the welder much more energy efficient. As can be appreciated, the use of the fuel cell power source and the engine driven electric generator in combination with the battery power source enables higher transient power capability to the welder than possible with a single electrical source. In another and/or alternative aspect of the present invention, the hybrid energy source that is used by the electric arc welder is a more energy efficient system. Conventional engine driven welders required the engine to drive an electric generator to produce a constant current source for welding, irrespective of whether an electric arc is being used to form a weld bead. The engine and generator had to be sized to provide sufficient peak power capabilities to provide for the instantaneous current demands for the electric arc. This power source configuration resulted in the need for an oversized engine for most welding applications. This power source configuration also resulted in increased size and weight of the welder and increased operation noise. This power source configuration also resulted in reduced energy efficiencies, especially when the engine operated in idle mode. For some welding operations, the duty cycle is as low as 20%, thereby resulting in the engine operating in idle mode for up to 80% of time. The fuel used by the engine and any current generated by the electric generator during the idle mode was not used to form an electric arc, thus resulting in zero efficiency. The hybrid energy source of the present invention significantly reduces this energy waste. During a particular welding operation, the current being supplied to the welding electrode is at least partially supplied by the battery power source. The welder can be designed such that up to 100% of the current for welding is directly supplied by the battery power source, or the welder can be designed such that a portion of the current is supplied by a battery power source and a portion is supplied by the non-battery power source (e.g., electric generator, fuel cell, etc.). When an electric arc is not being generated for a welding process, the current generated by the non-battery power source is directed into the battery power source so as to recharge the battery power source. The current being generated by the non-battery power source is thus being used to recharge the battery power source and/or to supply current to an electric arc during a welding process resulting in significantly less energy being wasted during the operation of the electric arc welder. As a result, the use of the hybrid power source of the present invention results in a majority of the power being generated by a non-battery source during the operation of the welder to be used as power to form the electric arc and/or power to recharge the battery power source. Such high energy efficiencies can be achieved even when the duty cycle for a particular welding operation is as low as 20%. Energy efficiencies for the hybrid power source can approach 100% even when duty cycles for a welding operation are less than 50%. In one embodiment of the invention, the hybrid power source includes an engine driven electric generator and a rechargeable battery. The battery power source is used to drive a chopper type welding control platform. When a weld bead is being formed on a workpiece, the electrical current stored in the battery power supply is principally used or is used in conjunction with the current generated from the electric generator to provide current for the electric arc. During the period of time when an electric arc is not being generated, the power from the electric generator is used to replenish the charge in the battery power source. By using the battery power source as the partial or sole current supplier for the electric arc, a smaller engine and electric generator can be utilized to sufficiently recharge the battery power system. The normal duty cycle for most manual stick electric welding processes is about 20-40%. As a result, the engine/electric generator size can be selected so that enough current is generated by the electric generator during this duty cycle to maintain an adequate charge on the battery power source for this particular duty cycle range. For example, an electric welder that is designed to generate 10 kW of power would only require an engine/electric generator size to produce 4 kW of power using the hybrid energy source design of the present invention. The engine/electric generator of a conventional electric arc welder would need to be sized to produce the full 10 kW of power at all times, even though the welding arc would only be utilized for 20-40% of the time. In the hybrid energy source, the engine/electric generator size would be selected based upon the maximum duty cycle for a particular welding operation. For stick welding, the maximum duty cycle of 40% would be multiplied by the maximum kilowatts of power to be generated by the electric arc welder. For an electric arc welder that required the generation of 10 kW of power, the engine/electric generator size would be selected to generate at least 4 kW of power. The 4 kW of power represents the maximum energy draw on the battery power source during a welding operation per hour of welding. Since the battery power source can deliver the current on demand, power generation by the engine driven welder needs to only be enough to recharge the battery power source. In one non-limiting example, the size of the engine and electric generator is selected to generate a little more power than the calculated power requirement to account for energy losses and/or to provide enough current to properly charge the battery power source. Typically the engine and electric generator is sized to produce at least about 105% of the calculated power needed, and more typically at least about 110% of the calculated power needed, and generally less than about 200% of the calculated power needed. For conventional electric arc welder systems, a 25 hp engine is needed to generate 10 kW of power, whereas only a 9 hp engine is needed to generate 4 kW of power. The advantages of reducing the size of the required engine/electric generator as discussed above, in combination with the increased energy efficiencies due to less wasted energy by the engine driven electric generator and the reduction in the amount of fuel needed to run a larger engine, amounts to significant cost savings in the manufacture and operation of the electric arc welder. In another and/or alternative one embodiment of the invention, the hybrid power source includes one or more fuel cells and a rechargeable battery. The battery power source is used to drive a chopper type welding control platform. When a weld bead is being formed on a workpiece, the electrical current stored in the battery power supply is primarily used or is used in conjunction with the current generated by the one or more fuel cells to provide current for the electric arc. During the period of time when an electric arc is not being generated, the power from the one or more fuel cells is used to replenish the charge in the battery power source. By using the battery power source as the partial or sole current supplier for the electric arc, a smaller fuel cell configuration can be used in the welder that is designed to sufficiently recharge the battery power system during the time period that no electric arc is being generated. The battery power source is selected to be able to provide sufficient current during the peak current demand by the welder for a short period of time. During the time period when there is no current demand, the battery power source is recharged so that it can once again supply sufficient current during the peak current demand by the welder. This energy management system for the hybrid energy source enables a smaller non-battery power supply to be used in combination with a battery power supply to adequately provide the power needs for a welder.

In still another and/or alternative aspect of the present invention, the battery power source of the hybrid energy source of the electric arc welder is designed to have an adequate amp-hour size requirement to provide the welding arc requirements for the maximum welding output rating of the electric arc welder. In this particular configuration, the non-battery power source is designed to charge the battery power source through a charging control system to provide the optimum charge rate for maintaining an adequate charge on the battery power system to operate the electric arc welder during a particular duty cycle. During the generation of an electric arc, the peak current demand for the welder occurs. The battery power system is designed to supply sufficient current during this peak current demand period for a period of time. Generally, the battery power source is sized to supply sufficient current during a peak current demand period for at least about 30 seconds, typically at least about 60 seconds, more typically less than about 90 minutes, and even more typically about 2-30 minutes. As can be appreciated, the battery power source can be sized to supply sufficient current during a peak current demand period for other time periods. The charging control system for the battery power system can be based upon a number of different platforms such as, but not limited to, a SCR phase angle control integral to the rectifier, a chopper-based system, etc. By using a battery power source having an adequate amp-hour size to provide for the maximum welding output rating of the electric arc welder, the electric arc welder can be used for short periods of time without having to operate or use the non-battery power sources. This feature is useful for repair or maintenance welding in areas where sufficient electrical power is not available to power a line operated welding power source and the operating of an engine powered welder and/or fuel cell power system is unacceptable due to noise and/or exhaust issues.

In accordance with yet another and/or alternative aspect of the present invention, the electric arc welder is rated at least about 100 amperes. The electric arc welder of the present invention is designed to have an amp rating that is higher than portable electric arc welders that are commonly sold in retail outlets. These portable electric arc welders are light duty welders and have amp ratings that are significantly less than 200 amps. The electric arc welder of the present invention is designed for heavier duty use than these portable units and is also designed to generate significantly larger currents for significantly longer periods of time.

In accordance with still yet another and/or alternative aspect of the present invention, there is provided an electric arc welder having a power source that creates an electric arc between an electrode and a workpiece wherein the power source includes a battery power source, a non-battery power source and an electric circuit. The power source is designed to produce a current of at least about 100 amperes, and typically at least about 200 amperes; however, other current ratings can be used. In one embodiment of the invention, the electric circuit includes a battery charging circuit that at least periodically directs current from the non-battery power source to the battery power source during the operation of the non-battery power source to at least partially charge the battery power source. The battery charging circuit can be based on a variety of architectures (e.g., SCR based, chopper based, etc.).

In another and/or alternative embodiment of the invention, the electric circuit can be designed to direct current from the non-battery power source to the battery power source when an electric arc is not being formed between an electrode and a workpiece. In still another and/or alternative embodiment of the invention, the electric circuit can be designed to continuously direct current from the non-battery power source to the battery power source. In this particular arrangement, the electric circuit can be designed to prevent any of the current generated by the non-battery power supply to be directly routed to the electric arc, thus the electric arc is fully supplied by current from the battery power source.

In yet another and/or alternative embodiment of the invention, the electric circuit can be designed to direct less current from the non-battery power supply to the battery power source when an electric arc is generated than when no electric arc is being generated. In this arrangement, a portion or all of the current generated by the non-battery power source is directed to the electric arc and a portion or all of the current generated by the non-battery power source is directed to the battery power source to recharge the battery power source when no electric arc is being generated. In still yet another and/or alternative embodiment of the invention, the battery charging circuit can include an over charge circuit to prevent overcharging the battery power source.

In a further and/or alternative embodiment of the invention, the battery charging circuit can include a SCR phase angle control circuit and a rectifier to convert AC current to DC current for charging the battery power source. In still a further and/or alternative embodiment of the invention, the battery charging circuit can include a chopper circuit to charge the battery power source. In yet a further and/or alternative embodiment of the invention, the non-battery power source can include an engine driven electric generator, a fuel cell and/or a solar cell. As can be appreciated, the non-battery power source can also or alternatively be a power grid such as, but not limited to, an electric outlet and/or power line.

In one particular design, the non-battery power source is an engine driven electric generator. In another particular design, the non-battery power source is a fuel cell power system. In still yet a further and/or alternative embodiment of the invention, the battery power source has an amp-hour rating to provide sufficient current to meet the maximum welding output rating of the electric arc welder for at least about one minute, and typically at least about five minutes, and more typically about five to sixty minutes.

In another and/or alternative embodiment of the invention, the electric circuit includes a selector that selects current from the battery power source and/or the non-battery power source to supply current to the electric arc. The selector can include a manual selector and/or an automatic selector. The automatic selector can be designed to determine which power source(s) is available and to select the best power supply configuration based on the available power sources. In another and/or alternative embodiment of the invention, the electric circuit can include an arc inhibitor that prevents the formation of an electric arc between the electrode and the workpiece when a sensed power level of the battery power supply is below a preselected value. The arc inhibitor facilitates in preventing damage to the power battery power source due to fully discharging the power source, and/or prevents the formation of an arc that cannot be maintained due to low power levels.

In still another and/or alternative embodiment of the invention, the electric arc welder includes a wire feeder. In accordance with a further and/or alternative aspect of the present invention, there is provided an electric arc welder having a battery monitor that monitors the charge on the battery power source and generates a signal that is used to control the current directed to the battery power source from the one or more non-battery power sources. The battery monitor is used to prevent overcharge of the battery power source so as to extend the life of the battery power source. Many types of rechargeable batteries can be damaged if over charged. The battery monitor is used to limit or prevent such damage to the battery power source. The battery monitor can also be used to activate and/or engage a non-battery power source to begin charging and/or increase the charge rate of the battery power source when the battery monitor detects that the battery power source has a lower charge. A low battery charge can result in the weld arc to be prematurely extinguished if the battery power source becomes fully discharge prior to completing a welding process. The full discharge of the battery power source can also reduce the life of some type of rechargeable batteries. The battery monitor is also used to prevent or limit such damage to the battery power source and/or premature termination of a welding arc. In one embodiment of the invention, the battery monitor causes or controls the activation/deactivation the engine of an engine driven generator to control the charge on the battery power source. In one non-limiting design, the welder includes an engine control system that receives information from the battery power source concerning the charge level of the battery power source, and uses such information to control the operation of the engine that drives the electric generator. The engine control system can cause the engine to be turned off when a desired level of charge of the battery power source has been achieved. When the level of charge on the battery power source fall below a desired charge level, the engine control system can be designed to automatically turn on the engine and/or enable an operator to manually start the engine.

In another and/or alternative embodiment of the invention, the battery monitor causes or controls the activation/deactivation of one or more fuel cells to control the charge on the battery power source. In still another and/or alternative embodiment of the invention, the battery monitor causes or controls the activation/deactivation a circuit that regulates the flow of current from a non-battery power source to the battery power source to control the charge on the battery power source. In still another and/or alternative embodiment of the invention, the battery monitor can be designed to generate a signal that provides information to an operator about the charge level of the battery, and/or other information about the battery power source. In accordance with a further and/or alternative aspect of the present invention, there is provided an electric arc welder having an open circuit detector that facilitates in determining whether a welding arc is being formed or about to be formed during the welding process.

When the open circuit detector determines that a welding arc is not being formed or is not about to be formed, the open circuit detector controls or generates a signal that is used to control the operation of one or more components of the welder in a manner to conserve the charge on the battery power source. In one embodiment of the invention, the open circuit detector controls or generates a signal that is used to control the operation of the chopper of the welder. When the open circuit detector determines that a welding arc is not being formed or is not about to be formed, the open circuit detector turns off the chopper or generates a control signal that is used to turn off the chopper. The deactivation of the chopper results in a reduction of the power drain on the battery power source when the welder in not in use. As a result, the open circuit detector increases the life of the battery power source, facilitates in the recharging of the battery power source and/or improves the amount of time the battery power source can supply power to the welder. As can be appreciated, the open circuit detector can be used to slow or turn off, or generate a signal that is used to slow or turn off the operation of one or more other components of the welder that need not operate when the open circuit detector determines that a welding arc is not being formed or is not about to be formed. In another and/or alternative embodiment of the invention, the open circuit detector can be used to activate, reactivate or maintain activation, or generate a signal that is used to activate, reactivate or maintain the operation of one or more other components of the welder when the open circuit detector determines that a welding arc is being formed or is about to be formed. In still another and/or alternative embodiment of the invention, the open circuit detector measures or monitors the voltage level between a workpiece and the welding electrode to facilitate in determining whether a weld arc is being formed, whether a weld arc is about to be formed, or whether a weld arc is not being formed and is not about to be formed. In yet another and/or alternative embodiment of the invention, the open circuit detector receives a signal from a switch or trigger on a welding gun to facilitate in determining whether a weld arc is being formed, whether a weld arc is about to be formed, or whether a weld arc is not being formed and is not about to be formed. As can be appreciated, other or additional arrangements can be used by the open circuit detector to facilitate in determining whether a weld arc is being formed, whether a weld arc is about to be formed, or whether a weld arc is not being formed and is not about to be formed.

In an embodiment, a system provides power to a welding application that includes power conversion circuitry configured to generate power suitable for a welding operation from an input power. A battery system is connected to the power conversion circuitry to provide the input power thereto. An engine is coupled to a generator to output electrical power to charge the battery system. Control circuitry is coupled to the battery system and the generator to control charging of the battery system.

In an embodiment, a system provides power to a welding operation that includes an engine coupled to a generator to produce electrical power. A battery is coupled to the generator to receive power from the generator to charge the battery. Control circuitry is coupled to the battery and the generator to control charging of the battery. Power conversion circuitry is coupled to the battery and configured to convert output power from the battery to power appropriate for a welding operation applied to a welding output. Power transmission circuitry is coupled to the generator and to the welding output to permit power from the generator to be applied to the welding output.

One object of the present invention is the provision of an electric arc welder that is powered by a hybrid energy source.

Another and/or alternative object of the present invention is the provision of an electric arc welder that can utilize a smaller engine/electric generator in conjunction with a battery power supply to generate a large welding current during a welding operation.

Still another and/or alternative object of the present invention is the provision of an electric arc welder that is more energy efficient.

Yet another and/or alternative object of the present invention is the provision of an electric arc welder that uses a battery power source individually or in combination with another power source to form an electric arc.

Still yet another and/or alternative object of the present invention is the provision of an electric arc welder that can be used in a multitude of environments.

A further and/or alternative object of the present invention is the provision of an electric arc welder which forms a high quality weld bead between two metal plates.

Still a further and/or alternative object of the present invention is the provision of an electric arc welder that includes a fuel cell and a battery to at least partially supply power to generate an arc between an electrode and the workpiece.

Yet a further and/or alternative object of the present invention is the provision of an electric arc welder that reduces noise and/or air pollution during operation.

Another and/or alternative object of the present invention is the provision of an electric arc welder that control the charge rate to the battery power source at least partially on the amount of charge on the battery power source.

Another and/or alternative object of the present invention is the provision of an electric arc welder that includes an open circuit voltage detector to control the operation of one or more components of the welder.

Still another and/or alternative object of the present invention is the provision of an electric arc welder that includes one or more control systems to increase the life of the battery power source.

These and other objects and advantages will become apparent taken together with the accompanying drawings.

BRIEF DESCRIPTION OF DRAWINGS

Reference may now be made to the drawings, which illustrate various embodiments that the invention may take in physical form and in certain parts and arrangements of parts wherein.

DETAILED DESCRIPTION

Figure 1:
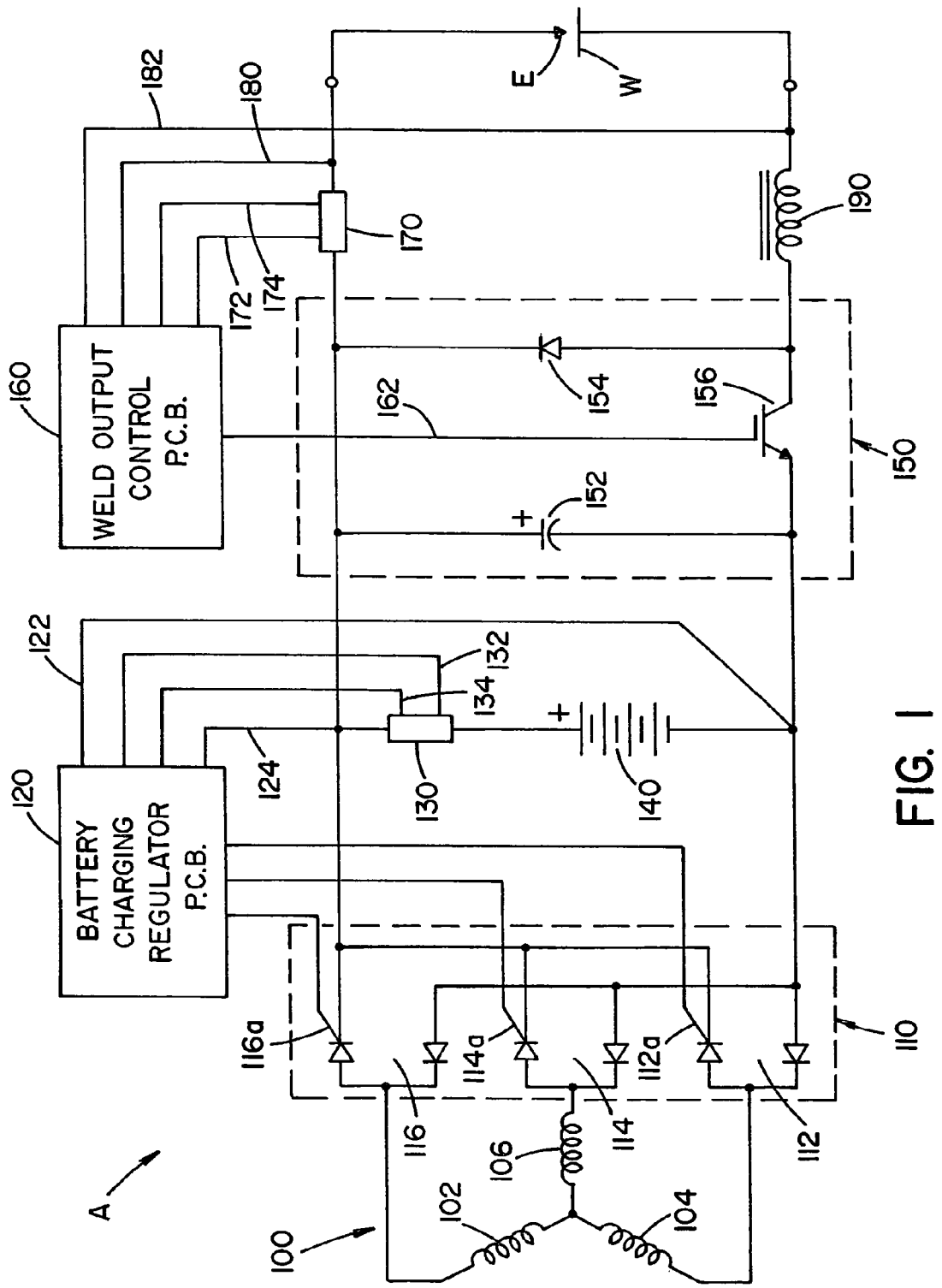
FIG. 1 is a wiring diagram of an embodiment of the present invention.
Figure 2:
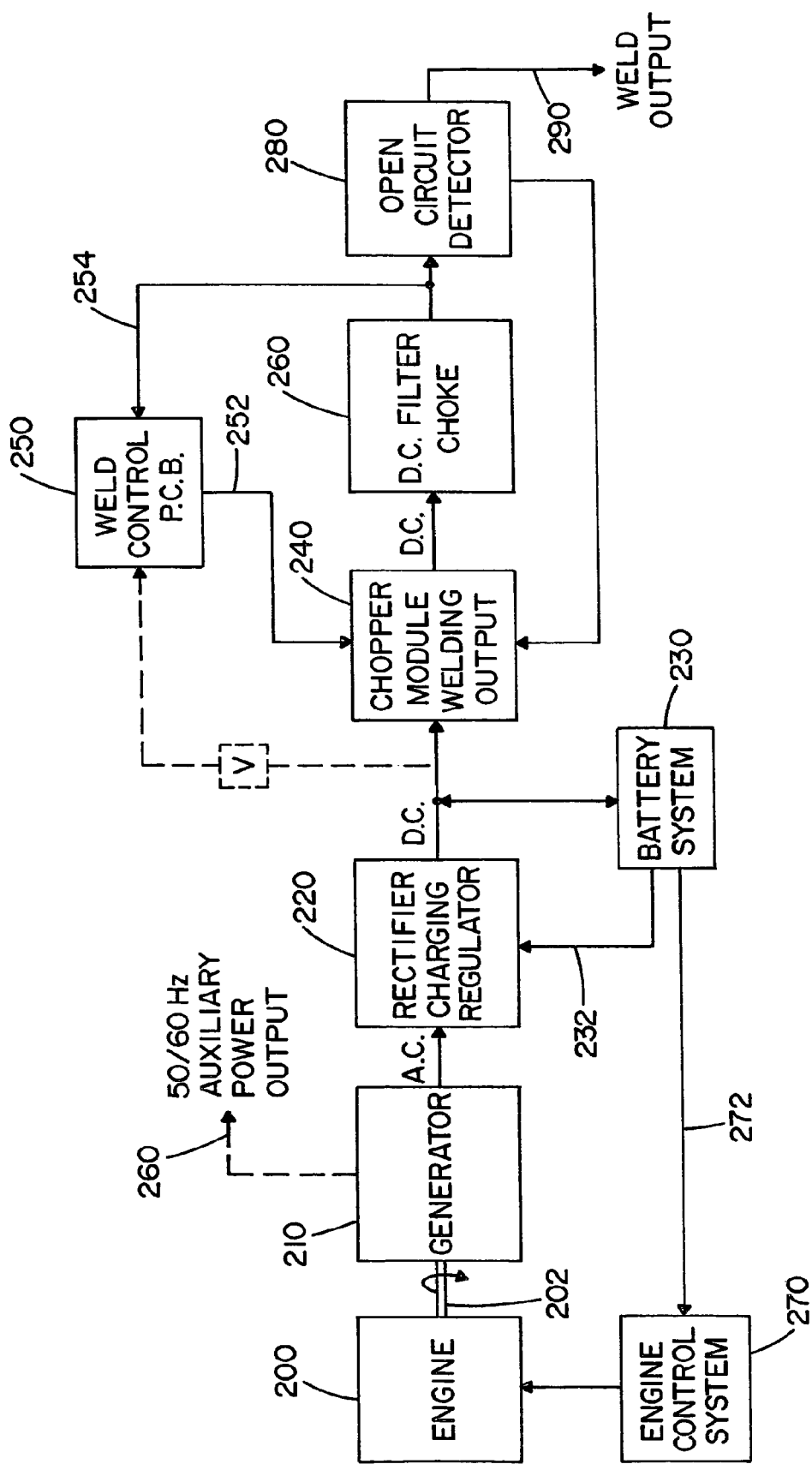
FIG. 2 is a block diagram of an embodiment of the present invention.

Referring now to FIGS. 1 and 2 wherein the showings are for the purpose of illustrating the preferred embodiments only and not for the purpose of limiting same, there is illustrated an electric arc welder that includes a hybrid energy source. The hybrid energy source of the present invention can be substituted for most, if not all, power sources currently used in engine welders. Currently, engine welders are powered by a gasoline powered or a diesel powered engine used to drive an electric generator that creates a current used to form an electric arc during a welding procedure. The size of the engine and electric generator used in the engine welder is dependant on the maximum power rating of the engine welder. The engine and electric generator used in prior engine welders must be of sufficient magnitude to supply the maximum power rating of the engine welder at any time, irrespective of the type of duty cycle of a particular welding operation. As a result, these past engine welders, which had a high power rating, included large engines and electric generators to generate the rated power for the engine welder. The hybrid energy source of the present invention is designed to provide large power ratings for an electric arc welder without having to use large engines and electric generators as presently required.

The hybrid energy source of the present invention utilizes two different power sources to provide the needed power for an electric arc. One power source is a rechargeable battery power source. The other power source is typically an engine driven electric generator. For purposes of describing this embodiment of the invention, the hybrid energy source only includes two power sources; however, it can be appreciated that additional power sources can be used. In addition, an engine driven electric generator is used in this particular embodiment; however, it will be appreciated that other or additional non-battery power sources can be used. The hybrid energy source is designed to have an output rating of at least about 100 amperes to power a medium or heavy duty welder.

A variety of electrical wiring diagrams can be used for practicing the present invention; however, one embodiment is illustrated in FIG. 1. The non-battery power source of welder A is an electric generator 100 having a plurality of output windings 102, 104, 106. The AC current generated by the electric generator is rectified by a rectifier bridge 110 that includes a line frequency switching network which includes three sets of SCRs 112, 114, 116 that are controlled by gate leads 112a, 114a, 116a.

The rectified current is directed to a battery charging regulator 120 used to monitor and control the charging of battery 140. The battery charging regulator receives a signal from the battery current feed back sensor 130 via lines 132, 134 to determine how much current is flowing into and/or from the battery. The battery current feed back sensor 130 is typically designed to monitor the flow of current to and from the battery. When the battery current feed back sensor senses the flow of current from the battery, the battery current feed back sensor will send a signal to the battery charging regulator that the battery is currently supplying current to form an electric arc between electrode E and workpiece W. While the battery is supplying current to the electric arc, the battery charging regulator can be designed such that no charging of the battery occurs. When the battery is not supplying current to the electric arc, the battery charging regulator can be designed to direct rectified current from the electric generator to the battery to recharge the battery. As can be appreciated, the current from the electric generator can be directed to electrode E when an electric arc is being generated. As can also be appreciated, the current from the electric generator can be directed to the battery even when an electric arc is being generated. The battery charging regulator can be designed to monitor or receive information concerning the charge level of the battery via lines 122, 124 and to regulate current to the battery to maintain sufficient charge.

As shown in FIG. 1, the current from battery 140 is directed to a chopper 150 which is used to generate the desired waveform of the welding current. The chopper includes a standard capacitor 152, diode 154 and switch 156 that is controlled by weld output control 160 via line 162. A weld output control 160 is used to control the chopper based on the current information received from current sensor 170 via lines 172, 174 and/or a voltage signal via lines 180, 182. A DC filter in the form of a choke 190 is used to smooth out the welding current to facilitate in obtaining the desired waveform for the welding current.

The operation of one embodiment of the invention is illustrated by the block diagram of FIG. 2. As illustrated in FIG. 2, engine 200 drives the electric generator 210 via a drive shaft 202. The electric generator generates an AC current which is rectified by the rectifier charging regulator 220. As illustrated in FIG. 2, electric generator 210 also can supply power to an auxiliary power output 260 for AC current. In addition, the AC current from generator 210 can be rectified and be partially directed to an auxiliary DC power output, not shown. The DC current from rectified charger regulator 220 is directed into battery system 230 to charge the battery when a feedback signal 232 indicates that the battery needs to be and/or is available for charging. The DC current supplied from the battery of battery system 230 is directed into a chopper module welding output 240 which is used to form the desired current waveform during an arc welding process. The D.C. current from the rectified charge regular 220 can also be directly fed in the chopper module welding output 240. As such the D.C. current from the rectified charge regular 220 can be used to only charge battery system 230 or be used to both charge battery system 230 and supply current to chopper module welding output 240.

An engine control system 270 is provided to control the operation of engine 200. The engine control system receives a signal via line 272 from the battery system, which signal is representative of the charge on the battery system. When the battery system is fully charged, the engine control system slows or turns off engine 200. When the battery system is less than fully charged and/or below a predefined charge level, the engine control system causes the engine to increase in speed and/or be turned on.

Weld control 250 controls the chopper welding output via signal 252 based upon output current information received via line 254. FIG. 2 also illustrates that weld control 250 can additionally receive voltage information from the DC current being directed from battery system 230 to chopper module welding output 240. The DC current from the chopper welding output is directed into a DC filter choke 260 to smooth out the DC current used for forming the welding arc.

An open circuit detector 280 is provided to determine whether an arc is being formed or is about to be formed between the electrode and workpiece during a welding operation. When open circuit detector 280 does not detect an arc, the open circuit detector causes the chopper module 240 to turn off, thereby reducing a drain of power from the battery system. In one non-limiting design, the voltage level between the workpiece and electrode is monitored to determine the current state of the arc.

As illustrated in FIG. 2, all the current directed to the weld output is supplied by battery system 230. In order for the battery system 230 to supply the total current to the weld output 290, the size of the battery system is selected to have an adequate amp-hour size which can supply the maximum power rating of the welder for a sufficient period of time. Typically, the duty cycle for most manual stick welding is about 20-40%. As a result, during a period of about 10 minutes, an electric arc is generated for only two to four minutes. The size and amp rating of the battery system 230 must be sufficient to at least supply a full amount of power to the electric arc during this duty cycle in order to obtain a proper electric arc during an arc welding process. During the time that an electric arc is not generated, the rectifier charging regulator 220 directs DC current into battery system 230 to recharge the depleted battery system. It is desirable to select a battery which can rapidly recharge so that during the intermittent periods of time wherein an electric arc is not being generated, the battery can be rapidly recharged so that it will be able to generate an electric arc during a subsequent duty cycle. Typically, the amp-hour size of the battery is selected so as to provide the arc welding requirements for the maximum welding output rating of the welder for at least about one minute, and typically about 5-45 minutes.

As can be appreciated from the design and operation of the hybrid energy source for welder A, the size of engine 200 and electric generator 210 need not be sized to provide the maximum welding output rating of the welder. The size of engine 200 and electric generator 210 only needs to be sufficiently sized to provide enough current to the battery of battery system 230 to adequately recharge the battery after the battery has been partially discharged when forming an electric arc. For instance, if the maximum welding output rating of a welder is 10 kW of power, and the maximum average duty cycle for a welding operation is 40%, the engine and electric generator only needs to produce sufficient current to supply 40% of the maximum welding output rating since only this much current is being discharged by the battery system during a particular duty cycle for the welder. As a result, the size of the engine and the size of the electric generator can be significantly decreased by using the hybrid energy source of the present invention. In addition to the cost savings associated with using a smaller engine and electric generator, the efficiency rating for the use of the current generated by the electric generator is significantly increased since most of the current is used to recharge the battery after it has been partially discharged during the formation of an electric arc. In the past, only 20-40% of the current generated by the electric generator was used in welding operations when the duty cycle was about 20-40%, In addition to the increase in energy usage efficiency, the size of the motor needed to provide sufficient power to meet the maximum welding output rating of the welder is decreased since a smaller engine is needed to power the hybrid energy source. Another benefit of the hybrid energy source is the ability of the welder to generate a welding current without having to operate engine 200 and electric generator 210. When battery system 230 is fully charged, the battery system has an adequate amp-hour size to provide the welding arc requirements during a particular period of time. As a result, the welder can be used in locations where the running of an engine powered welder is unacceptable due to noise and/or engine exhaust issues.

Figure 3:
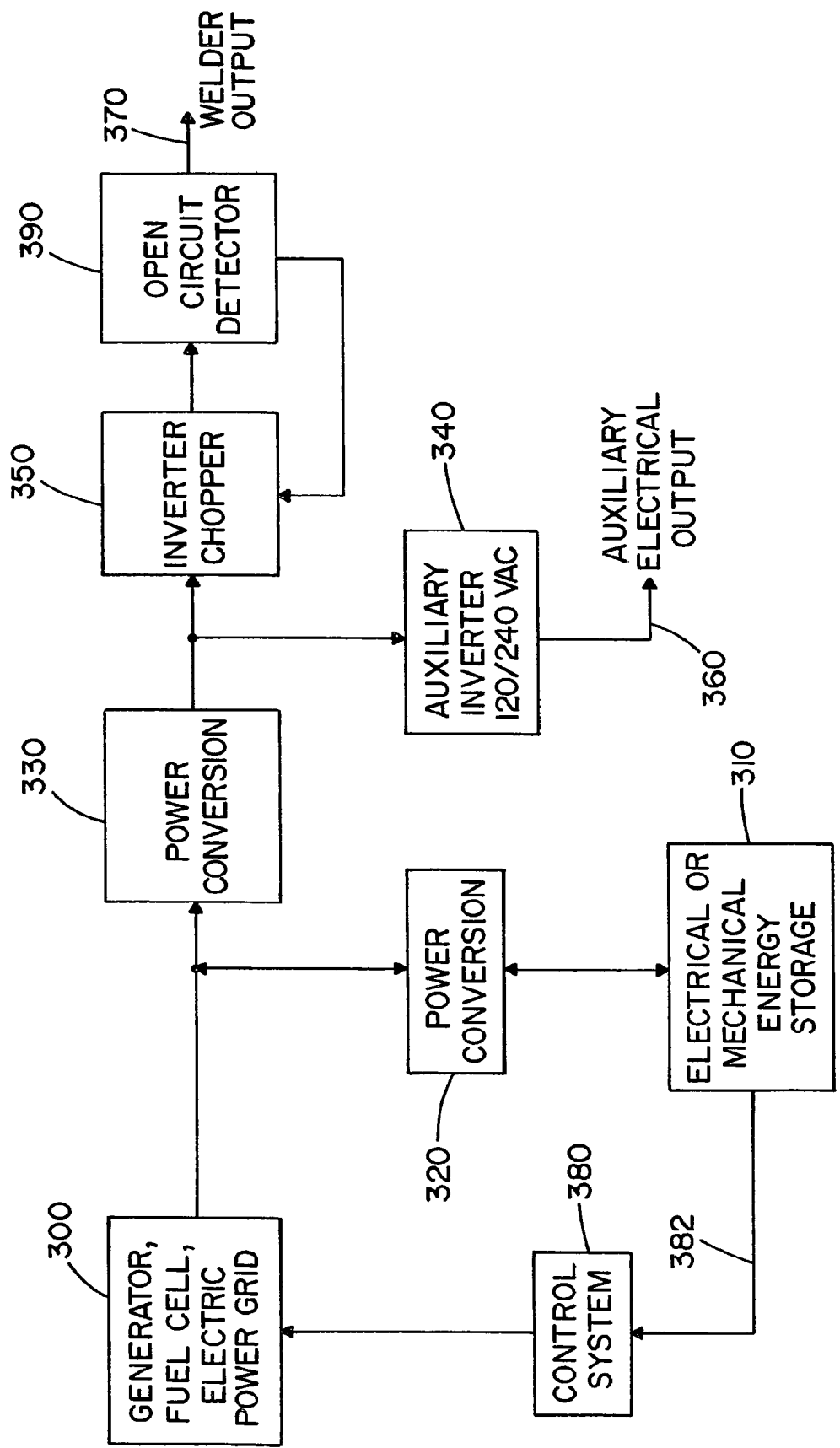
FIG. 3 is a block diagram of an embodiment of the present invention.

Referring now to FIG. 3, there is illustrated a welder which is powered by battery system and a non-battery system such as a fuel cell system, an electric generator, an electric power grid and/or the like. When a plurality of fuel cells are used as the non-battery system, the fuel cells are typically stacked together. A buck circuit and/or a boost-buck circuit may be provided to increase the voltage of the fuel cell system. Any number of fuel cell types can be used. Typically, a proton exchange membrane fuel cell is used; however, this is not required. When an electric power grid is used as the non-battery source, the electric power grid is typically an electric outlet or plug that is supplied power by a local or regional power grid system. When a generator is used as the non-battery source, the electric generator is typically an engine power generator as described above with respect to FIG. 2; however, this is not required. As can be appreciated more than one or type of non-battery source can be used to supply current to the welder.

The battery power source of the welder is illustrated as the electrical and mechanical energy storage 310. Typically, the electrical and mechanical energy storage system is made up of one or more rechargeable batteries; however, the electrical and mechanical energy storage system may include or alternatively be a capacitor, an inductor, and/or a fly wheel. Connected to the electrical and mechanical energy storage 310 is a power conversion circuit 320. Power conversion circuit 320 converts the power between an AC current and a DC current. As can be appreciated, if the electrical and mechanical energy storage 310 consists essentially of rechargeable batteries, power conversion circuit 320 could be eliminated. The current flowing from the fuel cell electric power grid and/or the electrical and mechanical energy storage is directed into a power conversion circuit 330. Similar to the power conversion circuit 320, power conversion circuit 330 converts the current from a DC source to an AC source. It can be appreciated that power conversion circuit 320 can be eliminated if a DC current is to be directed to inverter chopper circuit 350. As shown in FIG. 3, the welder can include an auxiliary electrical output 360 that can be used to provide electrical power to various types of devices that are plugged into the welder. Auxiliary inverter 340 can be used to modify current from a DC current to an AC current and/or modify the voltage level of the line voltage to be a 120 and/or 240 line voltage source to be sent to the auxiliary electrical output 360.

A control system 380 is provided to control the operation of or the current being provided by the non-battery source 300. The control system receives a signal via line 382 from the electrical and mechanical energy storage system, which signal is representative of the charge or energy level of the electrical and mechanical energy storage system. When the electrical and mechanical energy storage system is fully charged, the control system slows or turns off the generator or fuel cell and/or disengages the power grid from the welder. When the electrical and mechanical energy storage system is less than fully charged and/or below a predefined charge level, the control system causes the fuel cell or generator to turn on and/or generate more current, and/or reengages the power grid with the welder.

The current flowing from power conversion circuit 330 is directed into inverter chopper circuit 350 which is used to form the current waveform of the electric arc. The current waveform from the inverter chopper 350 is directed to welder output 370 for use in forming a weld bead on a workpiece.

An open circuit detector 390 is provided to determine whether an arc is being formed or is about to be formed between the electrode and workpiece during a welding operation. When open circuit detector 390 does not detect an arc, the open circuit detector causes the inverter chopper 350 to turn off, thereby reducing a drain of power from the non-battery power system. In one non-limiting design, the voltage level between the workpiece and electrode is monitored to determine the current state of the arc.

In one non-limiting configuration of the welding system illustrated in FIG. 3, the electrical and mechanical energy storage 310 is designed so as to provide the peak energy demand of the welder when the electric arc is formed between an electrode and a workpiece to form a weld bead. A fuel cell is sized and designed to generate a sufficient amount of power over a period of time so as to recharge the electrical and mechanical energy storage device 310 during the time that an electric arc is not being generated by the welder.

The invention has been described with reference to preferred and alternate embodiments. Modifications and alterations will become apparent to those skilled in the art upon reading and understanding the detailed discussion of the invention provided herein. This invention is intended to include all such modifications and alterations insofar as they come within the scope of the present invention.

The following is claimed:

1. A system that provides power to a welding application, comprising:
    power conversion circuitry configured to generate power suitable for a welding operation from an input power, said power conversion circuitry comprising a first circuitry and a second circuitry;
    a battery system connected to the power conversion circuitry to provide the input power thereto;
    an engine coupled to a generator to output electrical power to charge the battery system;
    said first circuitry coupled to the generator for converting the output power from the generator to power appropriate for the welding operation, and
    said second circuitry coupled to the battery system for converting the output power from the battery system to power appropriate for the welding operation;
    a power transmission circuitry configured to permit the generator and the battery system to simultaneously provide power for the welding operation;
    a detection circuitry configured to detect output of the battery system and to control operation of the engine based upon the battery system output, and wherein the detection circuitry is configured to start the engine based upon the battery system output;
    a control circuitry coupled in series to the battery system and the generator to control charging of the battery system, wherein the control circuitry allows the generator to charge the battery system based upon a predetermined event, and wherein the predetermined event is at least a depletion level of the battery system; and
    an electrode, wherein the power suitable for a welding operation is delivered to the electrode by summing power from the battery system and the engine.

2. The system of claim 1, wherein
    the first circuitry includes a switch for selectively interrupting provision of output power from the generator to the welding operation.

3. A system that provides power to a welding operation, comprising:
    an engine coupled to a generator to produce electrical power;
    a battery coupled to the generator to receive power from the generator to charge the battery;
    control circuitry coupled to the battery and the generator to control charging of the battery, wherein the control circuitry allows the generator to charge the battery based upon a predetermined event, and wherein at least one predetermined event is a depletion level of the battery;
    a first power conversion circuitry coupled to the battery and configured to convert output power from the battery to power appropriate for a welding operation applied to a welding output;
    detection circuitry in series with the battery and configured to detect output of the battery and to control operation of the engine based upon the output power of the battery output and wherein the detection circuitry is configured to start the engine based upon the output power of the battery; and
    a second power transmission circuitry coupled to the generator and to the welding output to permit power from the generator to be applied to the welding output, and further wherein the first and second power transmission circuitry is configured to permit the generator and the battery to simultaneously provide power for the welding operation.

4. The system of claim 3, wherein the second power transmission circuitry includes a switch for selectively interrupting provision of output power from the generator to the welding operation.

* * * * *